(12) United States Patent
Zarpellon

(10) Patent No.: US 8,848,101 B2
(45) Date of Patent: Sep. 30, 2014

(54) ORIENTABLE HEAD FOR SUPPORTING VIDEO-PHOTOGRAPHIC EQUIPMENT

(75) Inventor: Stelvio Zarpellon, Bassano del Grappa (IT)

(73) Assignee: Gitzo S.A., Rungis (FR)

( * ) Notice: Subject to any disclaimer, the term of this patent is extended or adjusted under 35 U.S.C. 154(b) by 426 days.

(21) Appl. No.: 12/676,557

(22) PCT Filed: Oct. 21, 2008

(86) PCT No.: PCT/EP2008/064189
§ 371 (c)(1),
(2), (4) Date: Mar. 4, 2010

(87) PCT Pub. No.: WO2009/062817
PCT Pub. Date: May 22, 2009

(65) Prior Publication Data
US 2010/0208131 A1    Aug. 19, 2010

(30) Foreign Application Priority Data
Nov. 14, 2007 (IT) .............................. PD2007A0383

(51) Int. Cl.
| | |
|---|---|
| *H04N 5/225* | (2006.01) |
| *F16M 11/12* | (2006.01) |
| *F16M 11/14* | (2006.01) |
| *F16M 11/20* | (2006.01) |
| *G03B 17/56* | (2006.01) |

(52) U.S. Cl.
CPC .............. *F16M 11/14* (2013.01); *F16M 11/12* (2013.01); *F16M 11/2014* (2013.01); *F16M 2200/022* (2013.01); *G03B 17/561* (2013.01)
USPC ....................................................... 348/373

(58) Field of Classification Search
CPC ..... G03B 17/561; F16M 11/12; F16M 11/14; F16M 11/2014; F16M 2200/022; F10C 11/106
USPC .................................................. 348/373, 375
See application file for complete search history.

(56) References Cited

U.S. PATENT DOCUMENTS

| 4,017,168 A | * | 4/1977 | Brown ......................... 352/243 |
| 4,208,946 A | * | 6/1980 | Van Sickle .................. 89/37.04 |

(Continued)

FOREIGN PATENT DOCUMENTS

| DE | 934549 C | 10/1955 |
| FR | 539238 A | 6/1922 |

(Continued)

OTHER PUBLICATIONS

International Search Report and Written Opinion in PCT application PCT/EP2008/064189.

(Continued)

*Primary Examiner* — Aung S Moe
*Assistant Examiner* — Amy Hsu
(74) *Attorney, Agent, or Firm* — Kristina Castellano; Castellano PLLC

(57) ABSTRACT

An orientable head (1) for supporting video-photographic equipment comprises:
  a first articulated joint member (2) on which an attachment means (8) for the video-photographic equipment is provided,
  a second articulated joint member (3) coupled to the first articulated joint member to permit the orientation of the video-photographic equipment into a preferred position,
  a level indicator (30) arranged on the first articulated joint member within a stem (5) extending between said attachment means and said second articulated joint member, for indicating the position of the video-photographic equipment with respect to the horizontal plane.

6 Claims, 2 Drawing Sheets

(56) References Cited

U.S. PATENT DOCUMENTS

| | | | |
|---|---|---|---|
| 4,366,940 A * | 1/1983 | Vargas | 248/542 |
| 5,289,090 A * | 2/1994 | Miller et al. | 318/282 |
| 6,147,701 A * | 11/2000 | Tamura et al. | 348/36 |
| 6,209,834 B1 * | 4/2001 | Stonehouse | 248/274.1 |
| 6,831,697 B1 * | 12/2004 | Chang | 348/373 |
| 6,834,839 B1 * | 12/2004 | Wilson | 248/316.6 |
| 7,089,676 B2 * | 8/2006 | Godinez | 33/371 |
| 7,221,866 B2 * | 5/2007 | Clemens | 396/322 |
| 7,372,502 B2 * | 5/2008 | Gonzalez | 348/373 |
| 7,488,126 B2 * | 2/2009 | Gonzales | 396/423 |
| 7,681,846 B1 * | 3/2010 | Mijailovic | 248/181.1 |
| 2006/0197867 A1 * | 9/2006 | Johnson et al. | 348/373 |
| 2007/0253704 A1 * | 11/2007 | Clemens | 396/439 |
| 2008/0006746 A1 * | 1/2008 | Volochine | 248/169 |
| 2008/0079848 A1 * | 4/2008 | Kung et al. | 348/373 |
| 2011/0050958 A1 * | 3/2011 | Kai | 348/231.99 |
| 2012/0062691 A1 * | 3/2012 | Fowler et al. | 348/36 |
| 2013/0163978 A1 * | 6/2013 | Carlesso | 396/428 |

FOREIGN PATENT DOCUMENTS

| | | |
|---|---|---|
| FR | 756476 A | 12/1933 |
| WO | 2008017442 A1 | 2/2008 |
| WO | 2008041853 A2 | 4/2008 |

OTHER PUBLICATIONS

International Preliminary Report on Patentability in PCT application PCT/EP2008/064189.

* cited by examiner

000
ORIENTABLE HEAD FOR SUPPORTING VIDEO-PHOTOGRAPHIC EQUIPMENT

CLAIM FOR PRIORITY

This application is a U.S. National Stage Application of PCT/EP2008/064189 filed on Oct. 21, 2008, which claims the benefit of Priority Application PD2007A000383 filed Nov. 14, 2007, the contents of both of which are hereby incorporated herein by reference.

TECHNICAL FIELD

The present invention relates to an orientable head for supporting video-photographic equipment, having the characteristics mentioned in the preamble of the main claim.

TECHNOLOGICAL BACKGROUND

In the technical field of reference of the invention, numerous orientable heads are known which are arranged for supporting video-photographic equipment and for orienting same with respect to a support plane.

In particular, heads are known which are equipped with an articulated joint of the ball-and-socket type comprising a first articulated joint member on which is fixed an attachment plate for video-photographic equipment and a second articulated joint member generally equipped with a means for anchorage to a stand such as a tripod or the like.

Heads of this type, known as ball-and-socket type heads, make it possible to lock the equipment in any preferred position (typically within a solid angle) with respect to the stand. Corresponding to this wide freedom of positioning, however, is the difficulty of accurately identifying some standard positions, in particular the state of parallelism or perpendicularity with respect to the horizontal plane.

This drawback is normally remedied by the provision on the attachment plate of one or more bubble type level indicators which, however, since they need to remain easily visible even with the equipment mounted, are normally placed in a protruding position, thus increasing the overall dimensions of the head.

SUMMARY OF THE INVENTION

The problem underlying the present invention is that of providing an orientable head for supporting video-photographic equipment, structurally and functionally designed to remedy the limitations mentioned above with reference to the prior art cited.

This problem is solved by the present invention by means of an orientable head produced according to the following claims.

BRIEF DESCRIPTION OF THE DRAWINGS

The characteristics and advantages of the invention will become clearer from the detailed description of a preferred exemplary embodiment thereof, illustrated by way of non-limiting example with reference to the appended drawings, in which.

PREFERRED EMBODIMENT OF THE INVENTION

Figure 1:
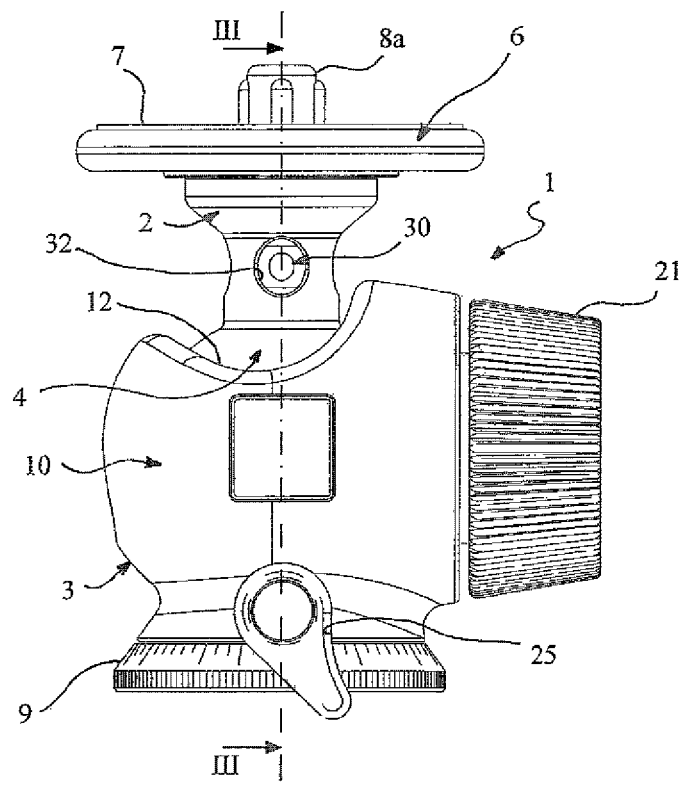
FIG. 1 is a front view of an orientable head for supporting video-photographic equipment, produced according to the present invention.
Figure 2:
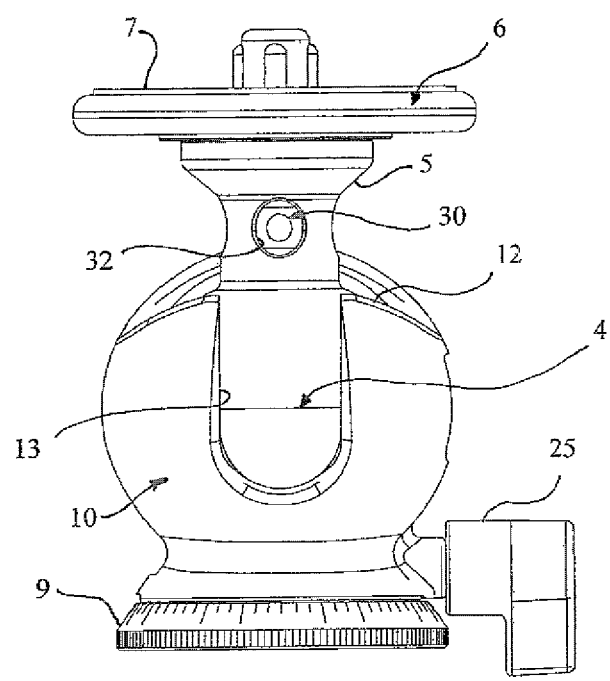
FIG. 2 is a view in side elevation from the left of the orientable head of FIG. 1.
Figure 3:
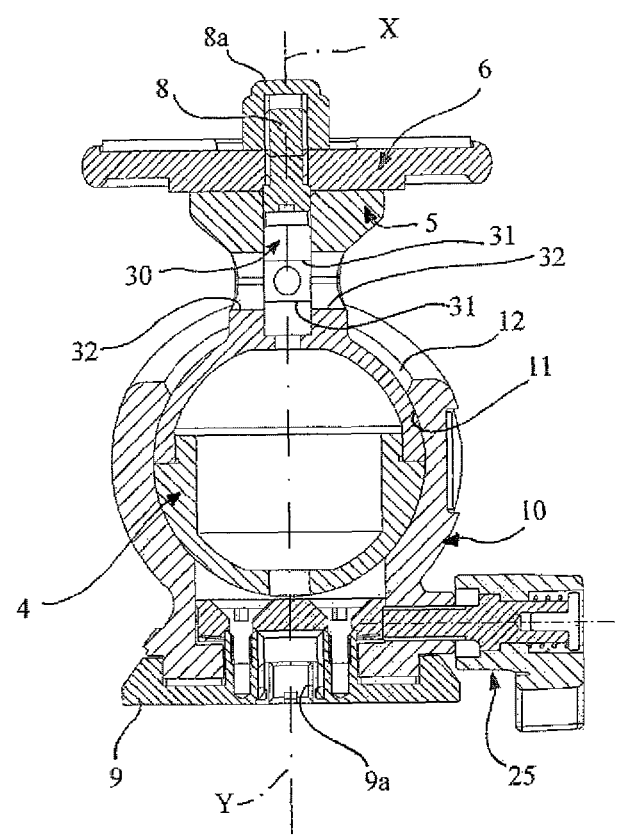
FIG. 3 is a sectional view of the head in the plane III-III of FIG. 1.

In the drawings, the reference 1 indicates as a whole an orientable head, produced according to the present invention.

The head 1 is structured for supporting video-photographic equipment and for orienting same with respect to a generic stand, such as a tripod or the like, the function of which is to provide solid support on the ground. Both the aforesaid video-photographic equipment and the stand are conventional per se, and are not therefore shown in the appended drawings.

The head 1 comprises a first articulated joint member 2 on which a first attachment means is provided for removable fixing to the video-photographic equipment, and also a second articulated joint member 3, equipped with a second attachment means for removable fixing to the stand.

The first and the second articulated joint member 2, 3 are coupled to each other in such a way as to permit the orientation of the video-photographic equipment with respect to the stand in a position preferred by the operator.

In the preferred form of the invention described herein, the coupling between the first and the second articulated joint member 2, 3 forms a ball-and-socket coupling.

In particular, the first articulated joint member 2 comprises a spherical cap 4 from which there extends radially along an axis X a stem 5 to which, at the opposite end from the spherical cap 4, a plate 6 is fixed, for example by means of screws. On the plate 6 a surface 7 is defined, intended for the support of the video-photographic equipment, and from which protrudes a screw rod 8, protected by a hood 8a and forming the aforesaid first attachment means. Preferably, the support surface 7 and the axis X of the stem 5 are substantially perpendicular to each other.

Naturally, the first attachment means may be formed in any other suitable manner.

The second articulated joint member 3 comprises a base 9 on which is fixed a main body 10, capable of rotation about an axis Y. The base 9 has a threaded hole 9a, preferably extending along the same axis Y and constituting the second attachment means, on which the stand can be fixed.

In the main body 10 a chamber 11 of generally spherical shape is provided in which the spherical cap 4 is received and held in engagement.

On the main body 10, on the opposite side from the base 9, an opening 12 in the chamber 11 is provided from which the stem 5 emerges and which, by interference, limits the possibility of orientation of the first articulated joint member 2 with respect to the second articulated joint member 3.

The profile of the opening 12 further has a recess 13 extending towards the base 9, so as to permit the displacement of the stem 5 into a substantially perpendicular position with respect to the axis of the base 9, used in general to bring the equipment into the position known as "portrait" (not shown in the appended drawings).

The head 1 further comprises a first locking means, acting between the first and the second articulated joint member 2,3 to lock same in a desired relative position.

The first locking means may be of any type suitable for the purpose, and may for example comprise a sliding block integral with the main body 10 and movable against the spherical cap 4 by means of the actuation of an external knob 21.

The head 1 likewise comprises a second locking means 25 acting between the base 9 and the main body 10 to lock same in a desired angular position about the axis Y.

The head 1 comprises a level indicator 30 arranged on the first articulated joint member 2 and the function of which is to indicate the position of the equipment with respect to the horizontal plane.

According to a first aspect of the invention, the level indicator 30 is housed in a seat provided inside the stem 5, and preferably extending along the axis X of same. The level indicator 30 is held in position inside its seat by the screw rod 8.

Preferably, in order to limit costs, the level indicator 30 is of the bubble type, for example cylindrical, on the outer surface of which a pair of circular references 31 is provided.

In order to permit observation of the indication provided by the level indicator 30, the stem 5 has provided on it, for example by milling, a plurality of windows 32, which are preferably arranged at a pitch about the stem 5. In this way, the observation of the level indicator 30 is permitted independently of the angular position of the first articulated joint member 2 about the axis X.

The level indicator 30 is useful for indicating the position of parallelism of the stem 5 (and, consequently, of perpendicularity of the support surface 7) with respect to the horizontal plane. This position is sought in order to displace the equipment into the "portrait" position described previously, with the stem 5 received inside the recess 13. In this specific position, the gas bubble present within the indicator 30 will be arranged between the circular references 31.

The head 1 may conveniently be equipped with an auxiliary level indicator (not shown) arranged for indicating the state of parallelism of the support surface 7 with respect to the horizontal plane. In this case, the auxiliary level indicator will be mounted on the plate 6, in a conventional manner.

It should be noted that owing to the stratagem of the invention, the head 1 has smaller overall dimensions compared with similar orientable heads equipped with level indicators of the bubble type, inasmuch as the level indicator 30 is completely contained within the volume of the stem 5.

In addition, since the level indicator 30 is arranged for "portrait" type positioning, the plate 6 does not normally constitute a hindrance to its observation.

The present invention therefore solves the problem mentioned above with reference to the prior art cited, at the same time providing numerous other advantages, including the fact of providing a support which is less exposed to accidental breakage and malfunctions. In fact, the placing of the level indicator within the stem offers greater protection against possible impacts which, in conventional supports, may lead to breakage or misalignment of the level indicators.

The invention claimed is:

1. An orientable head for supporting video-photographic equipment comprising:
    a rotatable first articulated joint member on which an attachment means for said video-photographic equipment is provided, said first articulated joint member comprising a spherical cap and a stem extending radially from the spherical cap along an X axis,
    a second articulated joint member coupled to said first articulated joint member to permit the orientation of said video-photographic equipment into a preferred position, and
    a level indicator completely enclosed within the stem of said first articulated joint member, for indicating the position of said video-photographic equipment with respect to the horizontal plane, said level indicator including a plurality of windows so that observation of the level indicator is possible at any angular position of the first joint member,
    wherein said stem of said first articulated joint member extends from the attachment means towards the second articulated joint member, and wherein said level indicator is completely enclosed inside said stem.

2. The orientable head according to claim 1, wherein said first and second articulated joint member form a ball-and-socket coupling.

3. The orientable head according to claim 1, wherein said level indicator is of the bubble type.

4. The orientable head according to claim 1, wherein a plurality of windows are provided on said stem, arranged at a pitch about said stem, to permit the observation of said level indicator independently of the angular position of said first articulated joint member.

5. The orientable head according to claim 1, wherein said attachment means comprises a plate mounted at an end of said stem opposed to said second articulated joint member, said plate having defined on it a support surface for supporting said video-photographic equipment on said first articulated joint member, said level indicator being arranged in said stem in such a way as to indicate the state of perpendicularity of said support surface with respect to said horizontal plane.

6. The orientable head according to claim 1, wherein said Level indicator extends along a longitudinal axis of said stem.

* * * * *